No. 790,691.

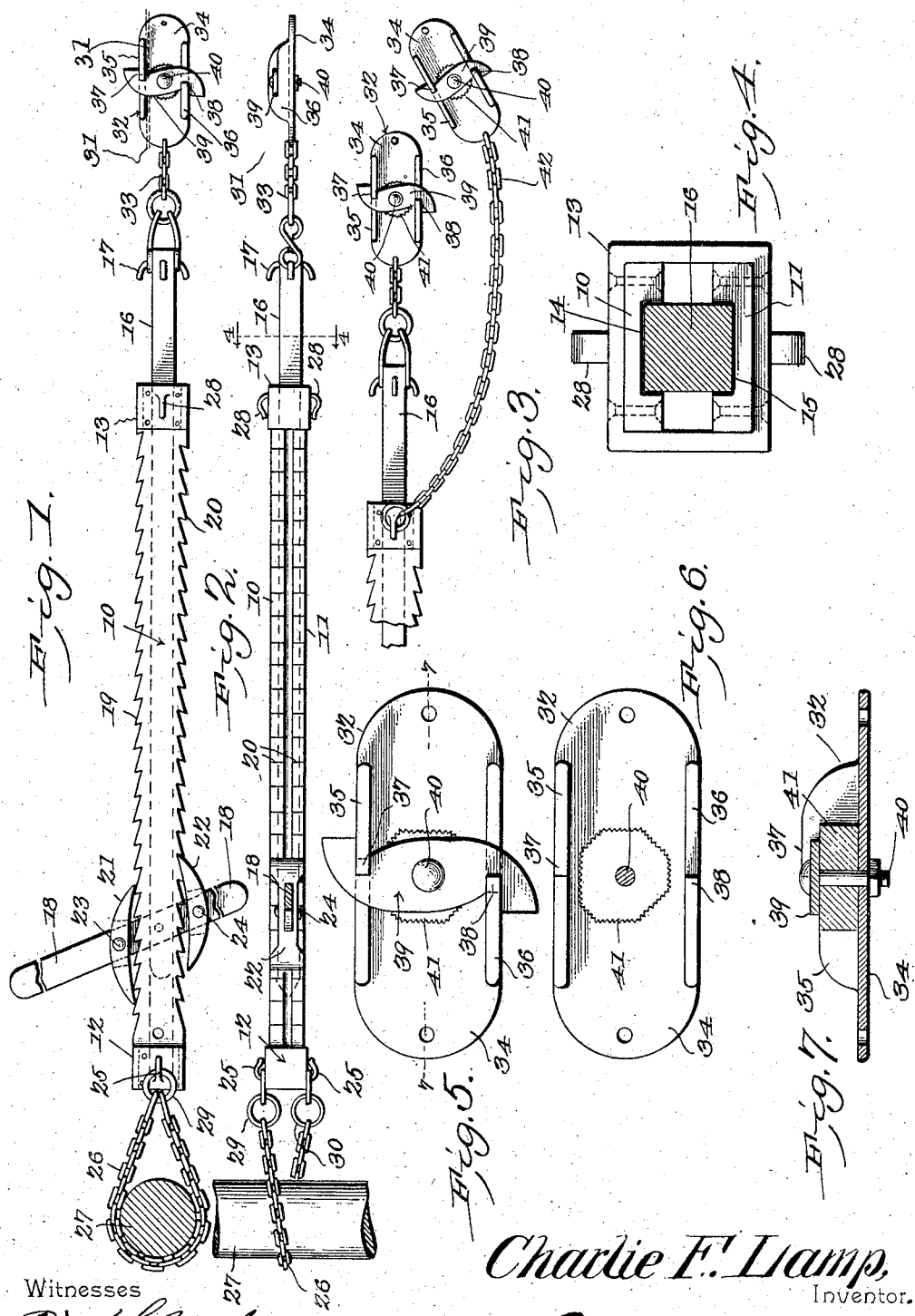

Patented May 23, 1905.

UNITED STATES PATENT OFFICE.

CHARLIE F. LAMP, OF DURANT, IOWA.

WIRE-STRETCHER.

SPECIFICATION forming part of Letters Patent No. 790,691, dated May 23, 1905.

Application filed September 21, 1904. Serial No. 225,389.

*To all whom it may concern:*

Be it known that I, CHARLIE F. LAMP, a citizen of the United States, residing at Durant, in the county of Cedar and State of Iowa, have invented a new and useful Wire-Stretcher, of which the following is a specification.

This invention relates to devices for stretching the strand-wires of fences, and has for its object to produce a simply-constructed and efficient device of this character without lateral or side draft, whereby all the strains are exerted in direct longitudinal alinement with both the device and the wire being strained, thus enabling the entire power to be employed directly upon the wire and none diverted by side draft.

Another object of the invention is to produce a device of this character wherein partially-stretched wire may be held while the implement is reset to stretch the wire to a greater extent, and so on indefinitely, thus accomplishing with one implement the labor which has heretofore required the employment of two or mere separate implements.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings thus employed, Figure 1 is a plan view, and Fig. 2 is a side view, of the implement applied. Fig. 3 is a detail view illustrating the manner of employing the device when resetting the device. Fig. 4 is a transverse section, enlarged, on the line 4 4 of Fig. 2. Fig. 5 is a plan view, enlarged, of the wire-engaging clamp. Fig. 6 is a similar view with the stop-lever detached. Fig. 7 is a sectional view on the line 7 7 of Fig. 5.

The improved implement comprises two bars 10 11, spaced apart and connected at the ends, respectively, by encircling bands 12 13 and provided with longitudinal guideways or channels 14 15 in their inner faces to slidably support a preferably square draw-bar 16. The draw-bar is provided at its operative end with lateral chain-hooks 17 and with a transverse aperture near its other or inner end to receive an operating-lever 18, which extends between the spaced bars 10 and 11 and projects at either side to a sufficient extent to provide the necessary leverage to operate the device. These hooks 17 are preferably formed by rods inserted through the draw-bar with their projected ends bent into hooks.

The parts may be of any required size, but in practice the bars 10 11, the draw-bar 16, and the lever member 18 will generally be about three feet long.

The edges of the bars 10 11 are provided with ratchet-teeth 19 20, inclining toward the operative end of the draw-bar, and with the points of the teeth 19 opposite the centers of the teeth 20 on the other side.

Pawls 21 22 are provided and formed with central transverse apertures through which the lever member 18 extends, to which the pawls are pivoted, respectively, as at 23 24. The pawls are each provided with two points, one point for engaging the ratchet-teeth during the forward or operative stroke and the other point for moving backwardly over the teeth during the return stroke, to maintain the forward ends of the pawls in position to instantly engage the teeth at the beginning of the forward stroke. By this simple means the necessity for employing holding-springs upon the pawls is obviated and their construction materially simplified.

The end band 12 is provided with integral hooks 25, to which the binding-chain 26 is connected by which to couple the device to a post 27 or other stationary support. The end band 13 is also provided with like integral hooks 28 to provide for the attachment of a wire-holding means to enable the stretched wire to be held while the device is being reset, as hereinafter explained.

The bars 10 11 and end bands 12 13 will preferably be constructed from pressed steel, and the hooks 25 28 formed by cutting U-shaped clefts through the side walls of the bands and pressing the tongues thus released into the requisite hook or loop form to receive the rings or links 29 30 of the coupling-chains.

In using the device for stretching the strand-wires in constructing new fences one end is coupled to a post or other stationary support, as at 27, by the chain or cable 26 from the hooks 25 on the band 12, and the wire to be stretched (indicated at 31) connected by a clamp mechanism 32 and chain 33 to the hooks 17 on the operative end of the draw-bar 16, the draw-bar having of course been previously extended to its outermost limit. Then by oscillating the lever member 18 the pawls 21 22 will be alternately caused to engage the ratchet-teeth 19 20, with the result of drawing the bar 16 into the space between the bars 10 11. When the draw-bar has thus been withdrawn to its greatest extent, one of the wire-clamps 32, connected as by chain 42 to one of the hooks 28 on the band 13, is connected to the stretched wire 31 in advance of the clamp which connects the wire 31 to the bar 16. The latter clamp is then released, which transfers the strain directly to the bars 10 11 and releases the draw-bar, which may be moved outward and connected to the wire again at another point and the strain again applied, and so on as often as required.

In relatively long fences the wires have frequently to be stretched several times the length of the range of the stretcher, and heretofore it has required two or more stretchers to fully stretch the wire, one for holding the stretched wire while the other is being reset for a new "grip." With the improved device herein shown and described this "take-up" action may be easily accomplished with one implement only, as above described, by providing the means, such as the hooks 28 on the main stock of the implement for the attachment of another of the holding-clamps and its chain 42. This is an important feature of the invention and adds materially to its value and efficiency.

If the ends of a broken wire are to be spliced, one of the wire ends will be coupled to the hooks 25 by one of the clamping devices and its chain and the other end coupled to the draw-bar 16 by another of the clamping devices and its chain and the two parts drawn together. Thus providing a number of the wire-clamping devices and their sections of coupling-chains all of the work necessary to be done in straining the wires in fence construction may be accomplished with one single stretcher mechanism, as will be obvious.

The wire-clamping device consists of a base-plate 34, having spaced side ribs 35 36, having alternately-disposed overhanging lips 37 38, beneath which a lock-bar 39 is disposed to pass when turned transversely of the base-plate, as shown. The bar 39 is pivoted to the base-plate, as at 40. Likewise pivoted to the same pin is a clamping-cam 41, provided with serrated sides for grasping the wire and holding it firmly locked against the ribs 35 and 36. The pin 40 is disposed eccentric to the periphery of the cam member, so that the wire will be suitably "pinched" between the cam and ribs, and the cam member is formed with a plurality of the cam-surfaces at different distances from the pivot-pin, so that wires of different sizes may be grasped by the same cam member. After the wires are pinched by the cam member the bar 39 is turned into connection with the overhanging lips 37 38 to prevent any accidental displacement of the wires.

Having thus described the invention, what is claimed is—

1. A wire-stretcher having spaced bars provided with ratchet-teeth, bands terminally embracing the bars and provided with hooks, anchoring means for connection with the hooks of one of the bands, a wire-clamp for connection with one of the hooks of the other band, a draw-bar working in the space between the spaced bars and projected at one end thereof, a wire-clamp for connection with the outer end of the draw-bar, and a double-acting lever pivoted upon the draw-bar and having pawls for alternate engagement with the ratchet-teeth.

2. In a wire-stretcher, the combination of a pair of spaced bars having two sets of ratchet-teeth, bands embracing and connecting the ends of the bars, the rear band being provided with hooks, an anchoring-chain detachably engaging the hooks, a draw-bar working between the spaced bars and provided at its forward end with a wire-clamp, and a double-acting lever pivoted upon the draw-bar and provided with pawls for alternate engagement with the sets of ratchet-teeth.

3. A wire-stretcher having a clamp including a base, a longitudinal abutment having a notched shoulder, a rotatable cam mounted upon the base in coöperative relation with the abutment, and a guard member rotatable with the cam and capable of being turned across the outer edge of the abutment into engagement with the notch of the shoulder.

4. A wire-stretcher having a wire-clamp including a base, an abutment thereon provided with a shoulder, a cam rotatable upon the base in coöperative relation with the abutment, and a guide member rotatable with the cam and capable of being turned across the abutment into engagement with the shoulder thereof.

5. A wire-stretcher having a wire-clamp including a base, spaced abutments upon the base and provided with reversely-disposed shoulders, a cam rotatable upon the base between and in coöperative relation with the abutments, and a guard rotatable with the cam with its ends capable of being turned across the outer edges of the respective abutments into engagement with the shoulders thereof.

6. A wire-stretcher comprising a relatively fixed member having anchoring means, a draw-bar carried by the fixed member, means for sliding the draw-bar upon the fixed member, a wire-clamp carried by the draw-bar, and another wire-clamp having a flexible connection with the fixed member and capable of engagement with a wire being stretched in front of the clamp of the draw-bar.

In testimony that I claim the foregoing as my own I have hereto affixed my signature in the presence of two witnesses.

CHARLIE F. LAMP.

Witnesses:
 LOUIS TREDE,
 C. C. JOHNSON.